(12) United States Patent
Houmes

(10) Patent No.: US 6,758,894 B1
(45) Date of Patent: Jul. 6, 2004

(54) STRONTIUM IRON MANGANESE BLACK PIGMENT

(75) Inventor: Joel D. Houmes, Hamilton, OH (US)

(73) Assignee: The Shepherd Color Company, Cincinnati, OH (US)

( * ) Notice: Subject to any disclaimer, the term of this patent is extended or adjusted under 35 U.S.C. 154(b) by 0 days.

(21) Appl. No.: 10/417,654

(22) Filed: Apr. 17, 2003

(51) Int. Cl.⁷ ................................................. C09C 1/22
(52) U.S. Cl. ...................... 106/459; 106/31.9; 106/461; 106/474; 252/62.63; 423/594.2; 423/633; 423/635; 428/432; 428/467; 428/469; 428/629; 428/649; 501/14; 501/15; 501/17; 501/123
(58) Field of Search ................................. 106/31.9, 459, 106/461, 474; 252/62.63; 423/594.2, 633, 635; 428/467, 469, 432, 629; 501/14, 15, 17, 123

(56) References Cited

U.S. PATENT DOCUMENTS

| | | | |
|---|---|---|---|
| 4,388,118 A | 6/1983 | Eppler | |
| 5,723,074 A | 3/1998 | Balachandran et al. | |
| 6,126,743 A | 10/2000 | Saegusa et al. | |
| 6,332,968 B1 | 12/2001 | Mazanec et al. | |
| 6,398,977 B1 | 6/2002 | Nakamura et al. | |
| 6,416,868 B1 | 7/2002 | Sullivan et al. | |

FOREIGN PATENT DOCUMENTS

JP 09-211897 * 8/1997

OTHER PUBLICATIONS

Matsumoto and Sato, "Anodic Characteristics of $SrFe_{0.9}M_{0.1}O_3$ (M: Ni, Co, Ti, Mn) Electrodes," Electrochemica Acta (1980), 25(5); 539–43.

* cited by examiner

*Primary Examiner*—C. Melissa Koslow
*Assistant Examiner*—Shalie Manlove
(74) *Attorney, Agent, or Firm*—Frost Brown Todd, LLC

(57) ABSTRACT

A black pigment substantially free of objectionable transition metal materials is disclosed. This pigment is particularly useful for coloring glass since the absence of the transition metal gives it excellent recycling properties. The pigment is an alkaline earth (preferably strontium) iron manganese oxide material as specifically defined the in the present invention.

25 Claims, No Drawings

STRONTIUM IRON MANGANESE BLACK PIGMENT

TECHNICAL FIELD

The present invention relates to black pigments, and particularly black pigments useful for glass enamel coloring.

BACKGROUND OF THE INVENTION

Increased governmental requirements, particularly in Europe, regarding the recycling of automobiles and automobile parts, have placed pressure on automotive glass manufacturers to develop windshields and other glass parts that can be easily recycled. This pressure has, in turn, been passed on to pigment manufacturers whose pigments constitute a significant portion of the problems in the recycling process. Specifically, even small amounts of certain transition metal impurities (for example, vanadium, chromium, cobalt, nickel and copper) can color the recycled glass, greatly reducing its market value. Since automobile glass is generally a black enamel which incorporates black pigments, it is desirable to have a black pigment which does not include those transition metals in order to minimize the recycling problems which occur at the end of an automobile's life. In addition, since there may also be some health issues associated with some of those transition metal elements, there is also a substantial market for a blue-shade black pigment that is free from chromium and nickel.

Currently, most automobile black glass enamels employ copper chromite black pigment. This pigment provides satisfactory color and opacity but has the drawback of containing transition metals that will tint glass upon recycling. Strontium iron oxide ($Sr_2Fe_2O_5$) is known and has been studied for quite some time as a material in the electronics industry. It exists as an oxygen deficient perovskite. Of more relevance to the present invention is the fact that its color is reported to be black and that it contains none of the undesirable transition metals for pigment applications. This same perovskite structure can also be achieved using manganese in place of iron ($Sr_2Mn_2O_5$ and $SrMnO_3$, depending on the manganese oxidation state). Variants of all three compounds are also known to exist, where calcium, barium, samarium or europium substitute for all or part of the strontium. Within this same elemental group, phases with the compositions $SrFe_{12}O_{19}$, $Sr_4Fe_2O_{7-x}$ and $Sr_4Fe_3O_{10-x}$ also exist, as well as do their solid solutions with the elements listed above.

Strontium iron oxides and strontium manganese oxides are known for a variety of uses, including use as pigments. Examples of such disclosures follow.

U.S. Pat. No. 6,416,868, Sullivan et al., issued July 9, 2002, describes alkaline earth-manganese oxides which are taught for use as pigments. The pigments are taught to exhibit high infrared reflectance characteristics and low heat buildup properties.

U.S. Pat. No. 4,388,118, Eppler, issued Jun. 14, 1983, describes inorganic black pigments made by calcining raw materials such as manganese dioxide, manganese carbonate, strontium carbonate or calcium carbonate. It is taught that this pigment produced is particularly advantageous in that it contains no heavy metals or highly toxic material and that it has low oil absorption and high tinting strength.

Strontium iron oxide or similar doped variants are also taught for use in non-pigment applications, such as in dielectric materials (see, for example, U.S. Pat. No. 6,398,977, Nakamura et al., issued Jun. 4, 2002) or oxygen ion-conducting dense ceramics (see, for example, U.S. Pat. No. 5,723,074, Balachandran et al., issued Mar. 3, 1998). In addition, U.S. Pat. No. 6,126,743, Saegusa et al., issued Oct. 3, 2000, describes a process for the production of a dielectric glass utilizing a variety of metal oxides. Finally, U.S. Pat. No. 6,332,968, Mazanec et al., issued Dec. 25, 2001, describes a process wherein a membrane of a perovskite oxide of very broad composition is used in an electrochemical reactor.

Matsumoto and Sato, Electrochemica Acta (1980), 25(5); 53943, studies a variety of strontium iron manganese oxides for use as an anode in alkaline systems for generating oxygen.

SUMMARY OF THE INVENTION

The present invention relates to a method for providing black color to a substrate material (such as a coating, paint, plastic, glass, rubber, enamel, metal, composite or ink), comprising mixing with or coating onto said substrate material from about 0.1% to about 50% (by weight of the substrate) of a pigment having a formula

wherein A is selected from Ca, Sr, Ba, Mg, Lanthanides, and mixtures thereof;

x is from about 0.16 to about 99;

$0.5 \leq y < 1$; and $(x+1) \leq z \leq (x+3)$

The present invention also relates to black pigment materials in a particulate form having an average particle size of from about 0.1 to about 50 $\mu m$ (preferably from about 0.1 to about 2 $\mu m$, more preferably from about 0.5 to about 2 $\mu m$) having the formula given above. Finally, the present invention relates to a pigment composition comprising from about 0.1% to about 99% of a black pigment material, having a non-electronics grade purity, and having the same formula as that given above, the balance of the composition being a carrier for said pigment. The preferred pigment composition is in the form of frits; paste; dispersion in a solvent; dry powder; flush; lake; paint or plastic concentrate; paint, plastic or resin dispersion; or beads. A wide variety of dopant elements may be included in the pigment.

All percentages and ratios provided herein are "by weight" unless otherwise specified. Further, all patents and other literature references cited in this patent application are incorporated herein by reference.

DETAILED DESCRIPTION OF THE INVENTION

The present invention relates to the use of alkaline earth-iron-manganese oxides as pigments. These pigments have the formula

wherein A is at least one alkaline earth metal selected from calcium (Ca), strontium (Sr), barium (Ba), magnesium (Mg), and Lanthanides. In the preferred materials, A is strontium. x is from about 0.16 to about 99, preferably from about 0.16 to about 2, and most preferably about 0.9 to about 1.1. y defines the relative amount of iron and manganese in the compositions; y is at least about 0.5 and is less than 1, preferably from about 0.5 to about 0.9, and most preferably about 0.7. Finally, z defines the amount of oxygen in the compositions; z can range from about x+1 to about x+3, preferably from about x+1.5 to about x+2. Preferably, z is from about 2 to about 3, most preferably about 3.

The alkaline earth-iron-manganese oxide materials of the above formula have been found to possess excellent black pigment properties. The materials tend to contain relatively low levels of manganese and, as such, tend to not provide infrared reflectance or to include much brown in their coloration. The pigments are useful in many applications, including the coloration of organic chemical compositions such as plastics, rubbers and the like, coating compositions such as paints, printing inks and the like, and inorganic chemical compositions such as glass, enamels, porcelain enamels, and the like. The pigments are particularly useful for coloring glass enamels since, because they do not include difficult to recycle transition metals, they tend to have excellent recycling properties.

Substitutions into these pigment compositions can be made to enhance or otherwise modify their properties. Various dopants, known in the art, can be added in sufficient amounts such that they do not significantly affect the performance of the pigment in an adverse manner, while at the same time providing a beneficial modification to the pigment's properties. Examples of beneficial properties which can be provided based upon selection of specific dopants include darker color, bluer color, easier dispersion, opacity and heat stability. Typically, the total amount of such dopants does not exceed 20 mol % of the alkaline earth or transition metal component (i.e., from about 0.1% to about 20 mol % of the dopant). These dopants could include elements from Groups I-A, III-A, IV-A, V-A, VI-A, VII-A, I-B, II-B, III-B, IV-B, V-B, VI-B, VIII-B and the Lanthanide elements of the periodic table. Preferred dopants for use in the present invention include, for example: Ti, V, Cr, Co, Ni, Cu, Ca, Mg, Sr, Ba, K, Rb, Cs, Nb, Ta, Mo, W, Zn, Bi, Sb, Sn and the Lanthanide elements. Mixtures of dopants can be used.

Processes known in the art, such as dry blending techniques, sol-gel techniques, spray pyrolysis and/or chemical precipitation may be used to form the alkaline earth iron manganese oxide pigments of the present invention. Dry blending is a particularly preferred process for making the defined alkaline earth iron manganese oxide pigments. Typically, the raw materials are oxides of the alkaline earths, of manganese, and of iron, or compounds that will yield the desired oxides upon calcination. For example, iron may be supplied as iron sesquioxide or magnetite ($Fe_3O_4$). Alternatively, iron sulfates, nitrates or hydroxides are among the acceptable choices because, upon calicination, iron oxide will result.

The weight ratio of alkaline earth oxide or other alkaline earth compound to iron oxide and manganese oxide or other iron and manganese compounds is selected to produce the desired composition upon calcination. Mixing of the raw materials should be sufficient to assure good physical contact between the different materials present in order to assure complete reaction during calcination. This mixing may be accomplished, for example, by grinding in a hammer mill. It may also be adequate to blend the sample in a V-shell or similar mixer.

The mixed powders are preferably calcined at temperatures of from about 1000° F. (535° C.) to about 2400° F. (1315° C.), more preferably from about 1600° F. (870° C.) to about 2100° F. (1145° C.). Calcination times from about 1 to about 60 hours are preferred, more preferably from about 2 about 12 hours. In a preferred embodiment, the mixture is loaded into a refractory container that is capable of withstanding the reaction temperature. An acceptable refractory container will not react with the alkaline earth iron manganese oxide composition, nor will it melt at the reaction temperature. The container can be heated in an electric or gas-fired furnace or kiln, but any other method may be chosen if the method will heat the material to the necessary temperature for the reaction. A peak temperature, as required by the composition, is preferably reached and maintained for a time as short as 1 minute to as long as 16 hours or more. For example, a time of 4–6 hours may represent a good compromise between complete reaction and economy of manufacture. The calcination process may optionally include the loss or gain of oxygen in order to maintain electroneutrality.

After the starting oxides or compounds are mixed and heated or calcined, they are cooled, ground and dried, if necessary. Grinding is typically required to reduce the particle size of the pigment. An air mill is the preferred method of particle size reduction, but a media mill, ball mill, attrition mill, or other type of grinding device may be used. After grinding, the alkaline earth iron manganese oxide pigments preferably have an average particle size (measured by the light scattering method) of from about 0.1 to about 50 $\mu$m, more preferably from about 0.1 to about 2 $\mu$m, more preferably from about 0.5 to about 2 $\mu$m.

The pigments of the present invention can be supplied in dry particulate form, or they can be included in pigment compositions. Typically a pigment composition includes a coloring-effective amount of the pigment (generally from about 0.1 to about 99%, preferably from about 0.1 to about 20% of the composition), together with a carrier for the pigment. Carriers for the pigments are well known in the art (see, for example, The Pigment Handbook, Peter A. Lewis (ed.), John Wiley & Sons, 1988) and can include, for example, pine oil, glycols, waxes or molten glass powder. The pigment itself is generally of a non-electronics grade purity. What is meant by "non-electronics grade purity" is that the pigment material is pure enough to be handled and used as a colorant in, for example, a consumer product, but does not have to meet the exceedingly rigorous degree of purity required for a material which is used to make electronics components. Examples of pigment compositions which are included within the scope of the present invention include frits; pastes; dispersions of the pigment material in a solvent; dry powder; flush; lake; paint or plastic concentrate; paint, plastic or resin dispersion; or beads.

Frits are well known in the enameling and ceramic arts. A frit is a homogeneous melted mixture of inorganic materials that is used in enameling iron and steel and in glazing porcelain and pottery, and coating glass. Frit renders soluble and hazardous compounds inert by combining them with silica and other oxides. Frit also is used in bonding grinding wheels, to lower vitrification temperatures, and as a lubricant in steel casting and metal extrusion. Frit is prepared by fusing a variety of materials in a furnace and then rapidly quenching the molten material. Constituents of the feed material depend on whether the frit is to be used as a ground coat or as a cover coat. For cover coats, the primary constituents of the raw material charge include silica, fluorspar, soda ash, borax, feldspar, zircon, aluminum oxide, lithium carbonate, magnesium carbonate, and titanium oxide. The constituents of the charge for a ground coat include the same compounds plus smaller amounts of metal oxides, such as cobalt oxide, nickel oxide, copper oxide and manganese oxide.

Glass enamels are high-solids liquids made from a mixture of glass powder, pigment, and suitable medium such as pine oil. There are also some thermoplastic enamels made with high-melting point waxes medium. These enamels are generally applied to a substrate for decorative purposes by screen printing a thin layer of the enamel onto a glass substrate. The enamel is dried after application, driving off the volatile medium. The entire coated article is then heated in a kiln to liquefy the glass enamel mixture to form a colored glass coating. Glass enamels are used to decorate beverage containers, automobile glass, and architectural glass panels.

The pigments of the present invention may be used as colorants for various types of materials. Examples of such materials include, for example, coatings, paints, plastics, glass, rubber, enamels, composites, inks, cosmetics, fibers, and glass enamels (both lead and non-lead). The pigments of the present invention are particularly useful with glass since, because of the absence of objectionable transition metals, they tend to recycle well. Plastic or rubber compositions to which the pigments may be added include polymeric materials that are natural or synthetic. Examples include natural resins, rubber, chlororubber, casein, oil-modified alkyd resins, cellulose acetate, cellulose propionate, cellulose acetobutyrate, nitrocellulose, or other cellulose ethers or esters. Synthetic organic polymers produced by polymerization, polyaddition, or polycondensation, and thermosetting or thermoplastics can also be colored using the pigments of present invention. Examples of such polymers include polyethylene, polystyrene, polypropylene, polyisobutylene, polyvinylchloride, polyvinylacetate, polyacrylonitrile, polyacrylic acid, other polyolefins and substituted polyolefins, methacrylic acid esters, butadiene, as well as copolymers of the above-mentioned materials. Examples of polyaddition or polycondensation resins include the condensation products of formaldehyde with phenols, phenolic resins, urea, thiourea, and melamine, amino resins, polyesters, polyamides, polycarbonates, and/or silicones. The pigments of the present invention may be included in a coating composition (e.g., a paint or enamel) which is coated onto an exterior surface of an article (such as ceramics), or it can be added to molten material (e.g., glass or plastic) and then formed into an article.

The pigments of the present application may also be provided in liquid or paste form. Suitable liquid carriers for the pigments include pine oils, vegetable oils, mineral oils, low molecular weight petroleum fractions, tridecyl alcohols, synthetic resins and natural resins. When used in paints for architectural, automotive, marine and other applications, the pigments of the present invention preferably comprise from about 0.1 to about 50 wt. % of the liquid paint composition, more preferably from about 1 to about 30 wt. %. For example, latex architectural paints preferably comprise from about 0.5 to about 50 wt. % of the pigments of the present invention, with the remainder of the paint composition comprising water, resin and solvents. Oil-based paints preferably comprise from about 0.5 to about 50 wt. % of the pigments of the present invention, with the remainder comprising organic solvents, resins and additives.

Examples describing the manner in which the pigments of the present invention may be synthesized and used follow. These examples are intended to be illustrative only and are not intended to be limiting of the scope of the present invention.

EXAMPLE 1

One mol of strontium carbonate is mixed with 0.35 mol of iron oxide and 0.1 mol manganic oxide, raw ground in a hammer mill to assure intimate mixing, and calcined at 1900° F. (1038° C.) for 6 hours. After cooling, the material is ground in an air mill to a particle size of about 1.2 µm. A chrome-free black pigment results.

EXAMPLE 2

One mol of barium carbonate is mixed with 0.25 mol of iron oxide and 0.167 mol manganic oxide, raw ground in a hammer mill to assure intimate mixing, and calcined at 1900° F. (1038° C.) for 6 hours. After cooling, the material is ground in an air mill to a particle size of about 1.2 µm. A chrome-free black pigment results.

EXAMPLE 3

Six parts glass powder is mixed with one part pigment of Example 1, and one part of a liquid medium, such as pine oil. The ingredients are mixed by passing them through a three-roll mill (for example), forming an ink. The ink is then screen printed onto a glass substrate and fired at a temperature (for example, 693° C.) that will burn off the organic material and liquefy the glass, forming a glass enamel coating.

What is claimed is:

1. A method for providing black color to a substrate material, comprising one or more of mixing with or coating onto said substrate a material comprising from about 0.1% to about 50% of a pigment having the formula

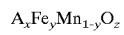

$$A_xFe_yMn_{1-y}O_z$$

wherein A is selected from Ca, Sr, Ba, Mg, Lanthanides, and mixtures thereof;

x is from about 0.16 to about 99;

$0.5 \leq y < 1$; and $(x+1) \leq z \leq (x+3)$.

2. The method according to claim 1 wherein the substrate material is selected from the group consisting of coatings, paints, plastics, glass, rubber, enamel, composites, inks, cosmetics, fibers, and glass enamel (both leaded and non-leaded).

3. The method according to claim 1 wherein x is from about 0.16 to about 2; y is about 0.5 to about 0.9; and z is from about 2 to about 3.

4. The method according to claim 3 wherein A is strontium.

5. The method according to claim 3 wherein x is from about 0.9 to about 1.1, y is about 0.7, and z is about 3.

6. The method according to claim 1 wherein the pigment additionally comprises no more than about 20 mol % of a dopant selected from elements of Group I-A, III-A, IV-A, V-A, VI-A, VII-A, I-B, II-B, III-B, IV-B, V-B, VI-B, VIII-B and the Lanthanide series of the periodic table, and mixtures thereof.

7. The method according to claim 6 wherein the dopant is selected from Ti, V, Cr, Co, Ni, Cu, Ca, Mg, Sr, Ba, K, Rb, Cs, Nb, Ta, Mo, W, Zn, Bi, Sb, Sn, and the Lanthanide elements, and mixtures thereof.

8. The method according to claim 6 wherein the pigment has an average particle size of from about 0.1 to about 50 µm.

9. The method according to claim 1 wherein the pigment is of a non-electronics grade purity.

10. A black pigment material in particulate form having the formula

$$A_xFe_yMn_{1-y}O_z$$

wherein A is selected from Ca, Sr, Ba, Mg, Lanthanides, and mixtures thereof;

x is from about 0.16 to about 99;

$0.5 \leq y < 1$; and $(x+1) \leq z \leq (x+3)$ having an average particle size of from about 0.1 to about 2 μm.

11. The pigment material according to claim 10 having an average particle size of from about 0.5 to about 2 μm.

12. The pigment material according to claim 10 wherein x is from about 0.16 to about 2; y is from about 0.5 to about 0.9; and z is from about 2 to about 3.

13. The pigment material according to claim 12 wherein A is strontium.

14. The pigment material according to claim 12 wherein x is from about 0.9 to about 1.1, y is from about 0.7, and z is about 3.

15. The pigment material according to claim 10 which additionally comprises no more than about 20 mol % of a dopant selected from elements of Group I-A, III-A, IV-A, V-A, VI-A, VII-A, I-B, II-B, III-B, IV-B, V-B, VI-B, VIII-B and the Lanthanide series of the periodic table, and mixtures thereof.

16. The pigment material according to claim 15 wherein the dopant is selected from Ti, V, Cr, Co, Ni, Cu, Ca, Mg, Sr, Ba, K, Rb, Cs, Nb, Ta, Mo, W, Zn, Bi, Sb, Sn, and the Lanthanide elements, and mixtures thereof.

17. The pigment material according to claim 10 wherein the pigment material is of a non-electronics grade purity.

18. A pigment composition comprising from about 0.1 to about 99% of a black pigment, having a non-electronics grade purity, and having the formula

wherein A is selected from Ca, Sr, Ba, Mg, Lanthanides, and mixtures thereof;

x is from about 0.16 to about 99;

$0.5 \leq y < 1$; and $(x+1) \leq z \leq (x+3)$;

the balance of said composition being a carrier for said pigment.

19. The pigment composition according to claim 18 wherein the carrier is selected from pine oil, glycols, waxes, molten glass, glass powder, and mixtures thereof.

20. The pigment composition according to claim 18 in the form of frit, paste, dispersion in a solvent; dry powder; flush; lake; paint or plastic concentrate; paint, plastic or resin dispersion; or beads.

21. The pigment composition according to claim 18 wherein x is from about 0.16 to about 2; y is from about 0.5 to about 0.9; and z is from about 2 to about 3.

22. The pigment composition according to claim 21 wherein A is strontium.

23. The pigment composition according to claim 21 wherein x is from about 0.9 to about 1.1, y is about 0.7, and z is about 3.

24. The pigment composition according to claim 18 wherein the pigment component additionally comprises no more than about 20 mol % of a dopant selected from elements of Group I-A, III-A, IV-A, V-A, VI-A, VII-A, I-B, II-B, III-B, IV-B, V-B, VI-B, VIII-B and the Lanthanide series of the periodic table, and mixtures thereof.

25. The pigment material according to claim 24 wherein the dopant is selected from Ti, V, Cr, Co, NI, Cu, Ca, Mg, Sr, Ba, K, Rb, Cs, Nb, Ta, Mo, W, Zn, Bi, Sb, Sn, and the Lanthanide elements, and mixtures thereof.

* * * * *